US012631661B2

(12) United States Patent
Kabe et al.

(10) Patent No.:  US 12,631,661 B2
(45) Date of Patent:  May 19, 2026

(54) AUTOMATIC ANALYZER AND SAMPLE ASPIRATION METHOD IN AUTOMATIC ANALYZER

(71) Applicant: HITACHI HIGH-TECH CORPORATION, Tokyo (JP)

(72) Inventors: Yoshihiro Kabe, Tokyo (JP); Takuya Takahashi, Tokyo (JP); Masashi Fukaya, Tokyo (JP); Kenshiro Sakata, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 500 days.

(21) Appl. No.: 18/272,225

(22) PCT Filed: Jan. 27, 2022

(86) PCT No.: PCT/JP2022/003085
§ 371 (c)(1),
(2) Date: Jul. 13, 2023

(87) PCT Pub. No.: WO2022/176556
PCT Pub. Date: Aug. 25, 2022

(65) Prior Publication Data
US 2024/0142487 A1      May 2, 2024

(30) Foreign Application Priority Data
Feb. 17, 2021    (JP) ................................. 2021-023092

(51) Int. Cl.
*G01N 35/10*          (2006.01)
*G01N 35/00*          (2006.01)

(52) U.S. Cl.
CPC ...  G01N 35/1016 (2013.01); G01N 35/00732 (2013.01); *G01N 2035/00782* (2013.01); *G01N 2035/1025* (2013.01)

(58) Field of Classification Search
None
See application file for complete search history.

(56) References Cited

U.S. PATENT DOCUMENTS

| | | | |
|---|---|---|---|
| 2014/0193918 A1* | 7/2014 | Takahashi | .......... G01N 35/1011 |
| | | | 422/67 |
| 2019/0204349 A1 | 7/2019 | Ariyoshi et al. | |
| 2024/0110936 A1* | 4/2024 | Muerset | ............. G01N 35/1016 |

FOREIGN PATENT DOCUMENTS

| | | |
|---|---|---|
| EP | 1 978 367 A1 | 10/2008 |
| JP | 50-11486 A | 2/1975 |

(Continued)

OTHER PUBLICATIONS

International Preliminary Report on Patentability received in corresponding International Application No. PCT/JP2022/003085 dated Aug. 17, 2023.

(Continued)

*Primary Examiner* — P. Kathryn Wright
(74) *Attorney, Agent, or Firm* — MATTINGLY & MALUR, PC

(57)          ABSTRACT

To provide an automatic analyzer and a sample aspiration method in an automatic analyzer capable of analyzing a sample of further minute amount compared than before. In aspirating the sample, a sample dispensing mechanism 13, 14 is controlled so as to detect the liquid level L1, to thereafter allow a dispensing probe 13a, 14a of the sample dispensing mechanism 13, 14 to be dropped and stopped below the liquid level L1, to thereafter allow the dispensing probe 13a, 14a of the sample dispensing mechanism 13, 14 to be elevated and stopped, and to thereafter allow the dispensing probe 13a, 14a of the sample dispensing mechanism 13, 14 to be further dropped while aspirating the sample.

6 Claims, 4 Drawing Sheets

(56)  References Cited

FOREIGN PATENT DOCUMENTS

| | | | |
|---|---|---|---|
| JP | H11-271322 | A | 10/1999 |
| JP | 11-352132 | A | 12/1999 |
| JP | 2007-225604 | A | 9/2007 |
| JP | 2010-048593 | A | 3/2010 |
| JP | 2010-48594 | A | 3/2010 |
| JP | 2012-063179 | A | 3/2012 |
| JP | 2019-120510 | A | 7/2019 |
| JP | 2019-148508 | A | 9/2019 |
| WO | 2010/104072 | A1 | 9/2010 |
| WO | WO-2023210174 | A1 * | 11/2023  ......... G01N 35/1016 |
| WO | WO-2025197528 | A1 * | 9/2025  ............. G01N 35/10 |

OTHER PUBLICATIONS

Extended European Search Report received in corresponding European Application No. 22754764.3 dated Nov. 25, 2024.
International Search Report of PCT/JP2022/003085 dated Apr. 5, 2022.
Chinese Office Action received in corresponding Chinese Application No. 202280010127.4 dated Dec. 17, 2025.

* cited by examiner

AUTOMATIC ANALYZER AND SAMPLE ASPIRATION METHOD IN AUTOMATIC ANALYZER

TECHNICAL FIELD

The present invention relates to techniques of an automatic analyzer used for chemical analysis and a method for controlling the automatic analyzer, and more particularly, to an automatic analyzer having a sample dispensing sequence capable of dispensing a trace amount sample and a sample aspiration method in the automatic analyzer.

BACKGROUND ART

As an example of a sample measurement method capable of appropriately performing measurement related to a blood coagulation test when measurement related to a blood coagulation test and measurement related to a test different from the blood coagulation test are performed, PTL 1 describes a sample measurement method in which first measurement related to a blood coagulation test and second measurement related to a test different from the blood coagulation test are performed. The sample measurement method includes: dispensing a sample used for the first measurement into a first container from a sample container; dispensing a sample used for the second measurement into a second container different from the first container from the sample container from which the sample used for the first measurement has been dispensed; performing the first measurement based on the sample dispensed into the first container; and performing the second measurement based on the sample dispensed into the second container.

CITATION LIST

Patent Literature

PTL 1: JP2019-120510A

SUMMARY OF INVENTION

Technical Problem

The automatic analyzer refers to a device that causes a biological sample (also referred to as a sample or the like) such as blood to react with an analysis reagent that specifically reacts with a measurement target component in the sample, and detects, by a spectroscopic method such as electrochemical luminescence, a complex generated by the reaction. All of the steps from detection of the measurement target component to output of a result are automatically performed.

Such an automatic analyzer includes a step in which a probe aspirates a sample (hereinafter referred to as a sample dispensing sequence).

A sample dispensing sequence in the related art is basically performed based on the following four steps.

(1) A probe is moved onto a sample container accommodating a sample.

(2) The probe is dropped until a distal end of the probe detects a liquid level. After the liquid level is detected, the drop of the probe is decelerated, and the drop is stopped in a state in which the distal end of the probe is inserted into the sample by a predetermined amount.

(3) The sample is aspirated. At this time, the probe is further dropped such that the distal end of the probe is not separated from the liquid level of the sample.

(4) The probe is elevated.

In such a sample aspiration step, there is an untested sample amount (dead volume) for each type of the sample container. When a sample amount equal to or less than the dead volume is to be dispensed, normal aspiration cannot be performed, and there is a risk of abnormality in analysis data. Therefore, the sample equal to or less than the dead volume cannot be dispensed.

However, for example, for a child or a patient whose blood is difficult to be collected, a sample amount that can be collected may be extremely small. In preparation for such a case, in the related art, the dead volume is reduced using a container dedicated to a trace amount sample, and the trace amount sample is dispensed.

Here, in a case of the trace amount sample, there is a restriction that a height from a bottom of the container to the liquid level is small. Therefore, in the sequence (2) and the sequence (3), there is a possibility that the distal end of the probe comes into contact with the bottom of the container during a period from the detection of the liquid level to the stop of the probe.

On the other hand, in dispensing control in the related art, there is a possibility that the distal end of the probe is blocked, and an aspiration failure case occurs. Alternatively, there is a possibility that, when the distal end of the probe excessively comes into contact with the bottom of the container, the device determines that abnormal drop is detected, and the trace amount sample cannot be dispensed.

As described above, there has been a need for testing with a trace amount sample. In addition, since a reduction in a sample amount to be collected leads to a reduction in burden even in a normal patient, a further trace amount of a sample is required in the future.

Further, a reduction in a sample dispensing amount can not only reduce burden of a patient but also reduce a reagent amount and a detergent amount, which leads to a reduction in running cost of a laboratory. Therefore, the need for a trace amount sample is high.

The invention provides an automatic analyzer and a sample aspiration method in the automatic analyzer capable of further analyzing a trace amount sample as compared with the related art.

Solution to Problem

The invention includes a plurality of units for solving the above problems, and as an example thereof, the invention includes: a sample dispensing mechanism configured to dispense a sample held by a sample container; a liquid level detector configured to detect a liquid level of the sample; and a control unit configured to control an operation of the sample dispensing mechanism. The control unit is configured to control, when the sample is to be aspirated, the sample dispensing mechanism such that, after the liquid level is detected, a distal end of the sample dispensing mechanism is dropped and stopped below the liquid level within such range that the distal end is not in contact with a bottom surface of the sample container, then the distal end of the sample dispensing mechanism is elevated and stopped within such range that the distal end of the sample dispensing mechanism does not depart from the liquid level, and then the distal end is further dropped while aspirating the sample.

Advantageous Effects of Invention

According to the invention, it is possible to analyze a trace amount sample as compared with the related art. Problems, configurations, and effects other than those described above will become apparent with the following description of an embodiment.

DESCRIPTION OF EMBODIMENTS

Figure 1:
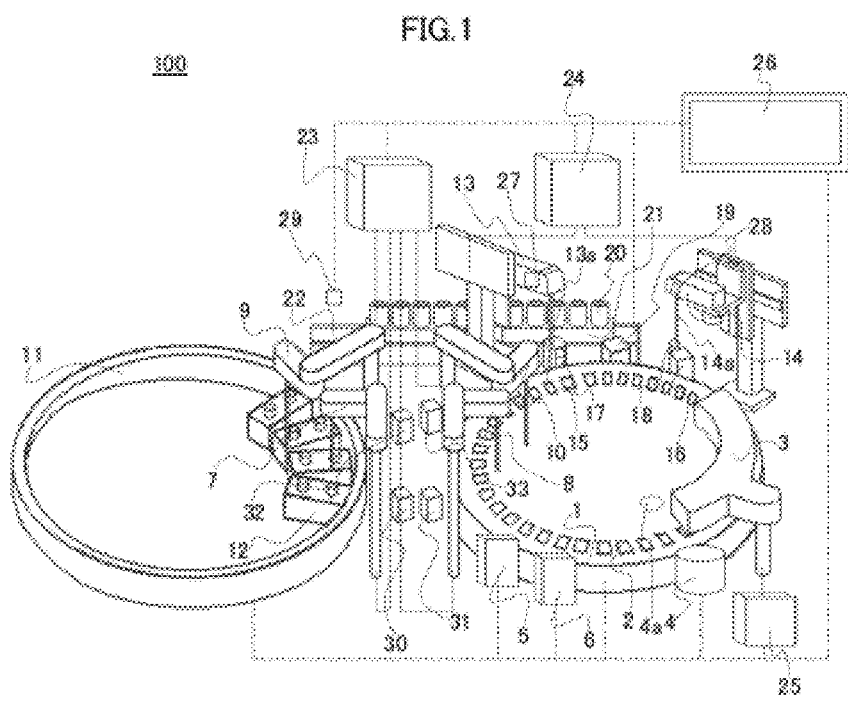
FIG. 1 is a schematic configuration drawing of an automatic analyzer of an embodiment of the present invention.

An embodiment of an automatic analyzer and a sample aspiration method in the automatic analyzer according to the invention will be described with reference to FIGS. 1 to 8. In the drawings used in the present specification, the same or corresponding components are denoted by the same or similar reference signs, and the repeated description of these components may be omitted.

First, an overall configuration of an automatic analyzer will be described with reference to FIG. 1. FIG. 1 is a perspective view of an automatic analyzer according to the present embodiment.

In FIG. 1, an automatic analyzer 100 is a device for dispensing a sample and a reagent into reaction containers 2 to cause reaction, and measuring the reacted liquid. The automatic analyzer 100 includes a reaction disk 1, a reagent disk 11, a sample transportation mechanism 22, reagent dispensing mechanisms 7, 8, 9, and 10, a reagent pump 23, sample dispensing mechanisms 13 and 14, a sample pump 24, a washing mechanism 3, a light source 4a, a spectrophotometer 4, stirring mechanisms 5 and 6, a washing pump 25, washing tanks 30, 31, 32, and 33, ordinary washing tanks 15 and 16, drying mechanisms 17 and 18, a special washing tank 19, a control unit 26, and the like.

The reaction containers 2 are arranged on a circumference of the reaction disk 1. The sample transportation mechanism 22 that moves a rack 21 is disposed near the reaction disk 1. Sample containers 20 is placed on the rack 21. The sample is held in the sample containers 20. The sample containers 20 are placed on the rack 21, and are carried by the sample transportation mechanism 22.

Between the reaction disk 1 and the sample transportation mechanism 22, the rotatable and vertically movable sample dispensing mechanisms 13 and 14 are disposed, and dispensing probes 13a and 14a are provided. The sample pump 24 is connected to the dispensing probes 13a and 14a via a syringe. The dispensing probes 13a and 14a move while drawing an arc around a rotation axis, and perform sample dispensing from the sample containers 20 to the reaction containers 2.

The sample dispensing mechanisms 13 and 14 are provided with liquid level detectors 27 and 28 that detect whether the distal ends of the dispensing probes 13a and 14a are in contact with a liquid level L1 (see FIG. 3 or the like) of the sample. The liquid level detectors 27 and 28 are implemented with, for example, static capacitance sensors, and are not limited to the static capacitance sensors. The liquid level detectors 27 and 28 can be optical sensors that emit light to the sample containers 20 from a side surface and detect the liquid level L1 based on the presence or absence of detection of reflected waves, cameras that capture images of the sample containers 20 and process the images, or the like.

The reagent disk 11 has a structure in which a plurality of reagent bottles 12 accommodating the reagent can be mounted on a circumference of the reagent disk 11. The reagent disk 11 is kept cold and is covered with a cover having an aspiration port (not shown).

Between the reaction disk 1 and the reagent disk 11, the rotatable and vertically movable reagent dispensing mechanisms 7, 8, 9, and 10 are disposed, and each includes a reagent dispensing probe. The reagent pump 23 is connected to the reagent dispensing probe via a syringe. The reagent dispensing probe moves while drawing an arc around a rotation axis, accesses an inside of the reagent disk 11, and dispenses the reagent from the reagent bottle 12 into the reaction containers 2.

The washing mechanism 3, the light source 4a, the spectrophotometer 4, and the stirring mechanisms 5 and 6 are disposed around the reaction disk 1. The washing pump 25 is connected to the washing mechanism 3 that washes the used reaction containers 2.

The washing tanks 30, 31, 32, and 33 are respectively disposed in operation ranges of the reagent dispensing mechanisms 7, 8, 9, and 10, the ordinary washing tank 15, the drying mechanism 17, the special washing tank 19 are disposed in an operation trajectory of the sample dispensing mechanism 13, and the ordinary washing tank 16, the drying mechanism 18, and the special washing tank 19 are disposed in the operation trajectory of the sample dispensing mechanism 13. The special washing tanks or the drying mechanisms can be disposed in operation trajectories of the reagent dispensing mechanisms 7, 8, 9, and 10. Washing tanks (not shown) are disposed in operation trajectories of the stirring mechanisms 5 and 6.

A container identifying unit 29 is a mechanism that identifies a type of the sample containers 20, and can be, for example, a bar code reader that reads bar codes attached to the sample containers 20, an RFID reader that reads information of RFID tags provided on the sample containers 20 or the rack 21, and a camera that captures images of the sample containers 20 and processes the images to identify the type of the sample containers 20. The type of the container identifying unit 29 is not particularly limited. The container identifying unit 29 is not limited to a form in which information of the sample containers 20 is received by a user from the control unit 26 or another system, and can be a form of a processing unit that identifies the type based on detection information of the liquid level L1 of the sample detected by the liquid level detectors 27 and 28.

The container identifying unit 29 identifies whether the sample containers 20 are containers for a "general sample" accommodating a specified amount of the sample or containers for a "trace amount sample" accommodating a small amount of the sample (for example, about 30 μl to 50 μl). The control unit 26 determines whether sample dispensing processing is to be executed for the "general sample" or for the "trace amount sample".

The control unit 26 is implemented with a computer or the like, is connected to each mechanism in the automatic analyzer including the sample dispensing mechanisms 13 and 14, controls the operations thereof, and performs arithmetic processing for obtaining a concentration of a predetermined component in the sample.

The overall configuration of the automatic analyzer 100 according to the present embodiment has been described above.

The configuration of the automatic analyzer 100 is not limited to a biochemical analyzer that analyzes biochemical analysis items as shown in FIG. 1, and can be an analyzer that analyzes other analysis items, such as an immune analyzer that analyzes immune analysis items. In addition, a form of the biochemical analyzer is not limited to that shown in FIG. 1, and an analyzer for measuring other analysis items, for example, an electrolyte, can be separately mounted.

The automatic analyzer 100 is not limited to a single analysis module configuration as shown in FIG. 1, and can be implemented such that two or more analysis modules, such as analysis modules capable of measuring various same or different analysis items or pretreatment modules performing pretreatment, are connected by a transfer device.

Sample analysis processing performed by the automatic analyzer 100 as described above is generally executed in the following order.

First, the sample in the sample containers 20 placed on the rack 21 is dispensed into the reaction containers 2 on the reaction disk 1 by the dispensing probe 13a of the sample dispensing mechanism 13 and the dispensing probe 14a of the sample dispensing mechanism 14. The container type of the sample containers 20 is identified by the container identifying unit 29 when the sample containers 20 are transported to the vicinity of the reaction disk 1 by the sample transportation mechanism 22. Next, the reagent to be used for analysis is dispensed, by the reagent dispensing mechanisms 7, 8, 9, and 10, from the reagent bottle 12 on the reagent disk 11 into the reaction containers 2 into which the sample has been dispensed earlier. Subsequently, a mixture of the sample and the reagent in the reaction containers 2 is stirred by the stirring mechanism 5.

Thereafter, light generated from the light source 4a is transmitted through the reaction containers 2 containing the stirred mixture, and a luminous intensity of the transmitted light is measured by the spectrophotometer 4. The luminous intensity measured by the spectrophotometer 4 is transmitted to the control unit 26 via an A/D converter and an interface. Then, the control unit 26 performs calculation to obtain the concentration of the predetermined component in the sample. A result is displayed on a display unit (not shown) or the like, or stored in a storage unit (not shown).

Figure 2:
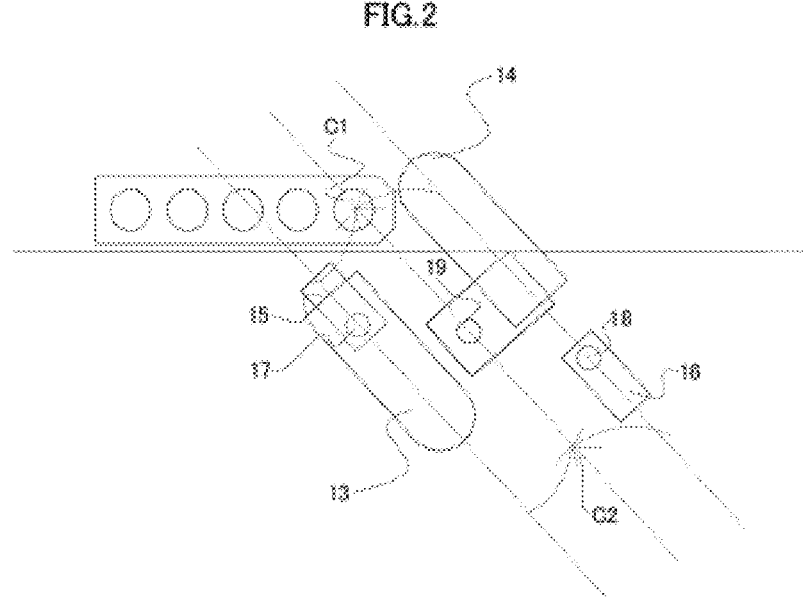
FIG. 2 is an explanatory drawing of a dispensing operation of a general sample in the automatic analyzer of the embodiment.

Next, a sample dispensing operation will be described with reference to FIG. 2. FIG. 2 is a diagram showing a dispensing operation of a general sample in the automatic analyzer according to the embodiment. Here, a dispensing operation of the sample dispensing mechanism 13 of the two sample dispensing mechanisms 13 and 14 will be described as an example. Since an operation and a mechanism of the sample dispensing mechanism 14 are the same as those of the sample dispensing mechanism 13, the details thereof will be omitted. The sample dispensing mechanism 13 is similarly shown as an example in the following description, and the same applies to the sample dispensing mechanism 14.

First, the sample dispensing mechanism 13 moves from the ordinary washing tank 15 to a sample aspiration position C1 on the sample container 20.

Thereafter, the dispensing probe 13a is dropped at the sample aspiration position C1, and the dispensing probe 13a is immersed in the sample accommodated in the sample container 20. In this state, a syringe operates to aspirate the sample, and then the dispensing probe 13a is elevated.

Thereafter, the sample dispensing mechanism 13 moves from the sample aspiration position C1 to the ordinary washing tank 15. At a position of the ordinary washing tank 15, an outer wall of the dispensing probe 13a is washed with water (external washing).

Thereafter, after the sample dispensing mechanism 13 moves to a sample discharge position C2 on the predetermined reaction container 2 on the reaction disk 1, the dispensing probe 13a is dropped, the syringe is operated to discharge the sample, and when the discharge of the sample is completed, the dispensing probe 13a is elevated.

Thereafter, the sample dispensing mechanism 13 is moved to the ordinary washing tank 15.

Here, when dispensing of the same sample is continuously performed, one cycle ends after the above operation. However, in the case of the last dispensing of the same sample, ordinary washing is further performed by an operation of the syringe. Specifically, water in a tank (not shown) is discharged from the dispensing probe 13a to wash not only the outer wall but also an inner wall of the dispensing probe 13a (internal washing).

[Dispensing Sequence of General Sample]

Figure 3:
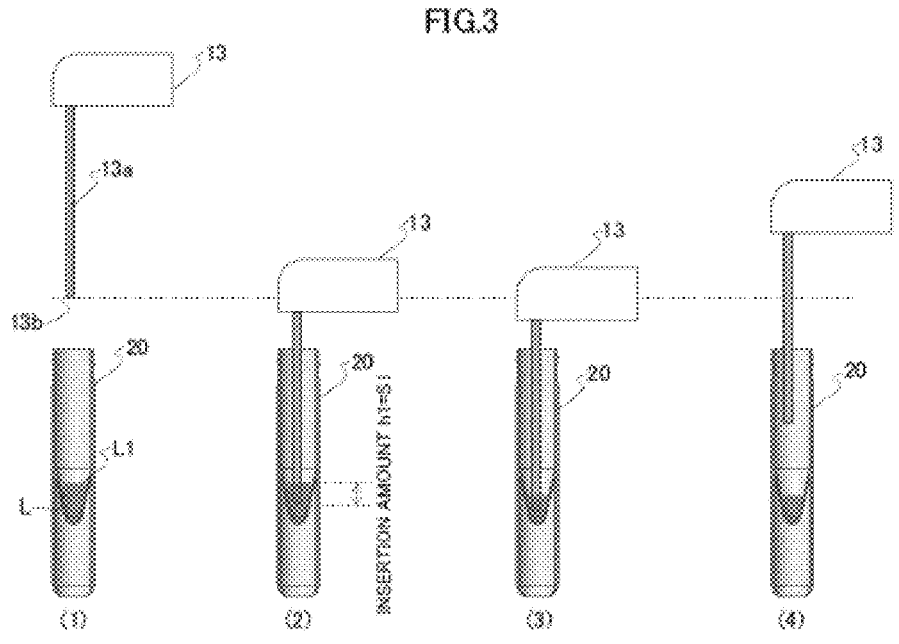
FIG. 3 is an explanatory drawing of a dispensing operation of a general sample in the automatic analyzer of the embodiment.
Figure 4:
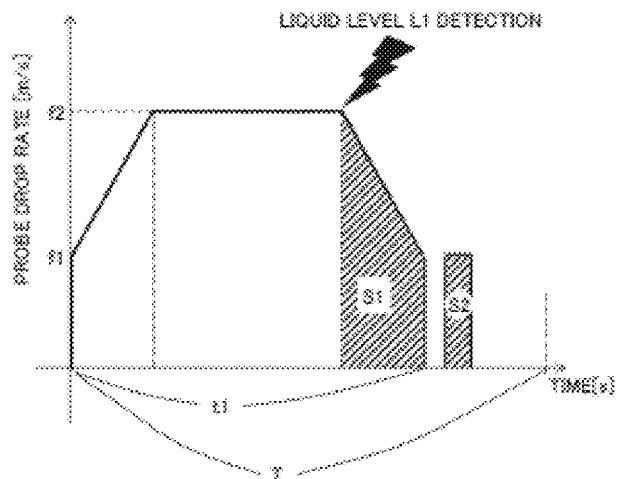
FIG. 4 is a drop operation drawing of a sample dispensing mechanism in dispensing a general sample in the automatic analyzer of the embodiment.

Next, in the sample dispensing operation, a step (hereinafter, a sample dispensing sequence) of aspirating, by the sample dispensing mechanisms 13 and 14, the sample from the sample container 20 holding the sample (general sample) of the amount corresponding to the specified amount will be described in detail with reference to FIGS. 3 and 4. FIG. 3 is a diagram showing the dispensing operation of the general sample in the automatic analyzer according to the embodiment. FIG. 4 is a diagram showing a drop operation of the sample dispensing mechanism during dispensing of the general sample in the automatic analyzer according to the embodiment.

First, as shown in (1) of FIG. 3, the dispensing probe 13a is moved onto the sample container 20.

Next, as shown in (2) of FIG. 3, the dispensing probe 13a is dropped until a distal end 13b of the liquid level detector 27 comes into contact with the liquid level L1. At this time, the drop operation of the sample dispensing mechanism 13 is performed with acceleration and deceleration as shown in FIG. 4.

After the start of the drop operation, the dispensing probe 13a is dropped while accelerating a drop rate from an initial rate f1 to a rate f2. After the distal end 13b detects the liquid level L1, the drop rate f2 of the dispensing probe 13a starts to be reduced, and stops at the final rate f1 when the distal end 13b is inserted into the sample by a certain amount (h1). The insertion amount h1 of the distal end 13b into the sample corresponds to a predetermined area S1 in FIG. 4.

Thereafter, as shown in (3) of FIG. 3, the syringe is operated to aspirate the sample. In order to prevent the dispensing probe 13*a* from separating from the sample liquid level during aspiration, the dispensing probe 13*a* is further dropped. A drop amount at this time corresponds to a predetermined area S2 in FIG. 4.

Thereafter, as shown in (4) of FIG. 3, the dispensing probe 13*a* is elevated after the aspiration is completed.

A series of dispensing operations shown in FIG. 3 (the dispensing probe 13*a* of the sample dispensing mechanism 13 and the dispensing probe 14*a* of the sample dispensing mechanism 14 are dropped and stopped below the liquid level L1, and then further dropped while aspirating the sample) is referred to as a general sample dispensing mode (second mode) in the invention.

[Dispensing Sequence of Trace Amount Sample]

Figure 5:
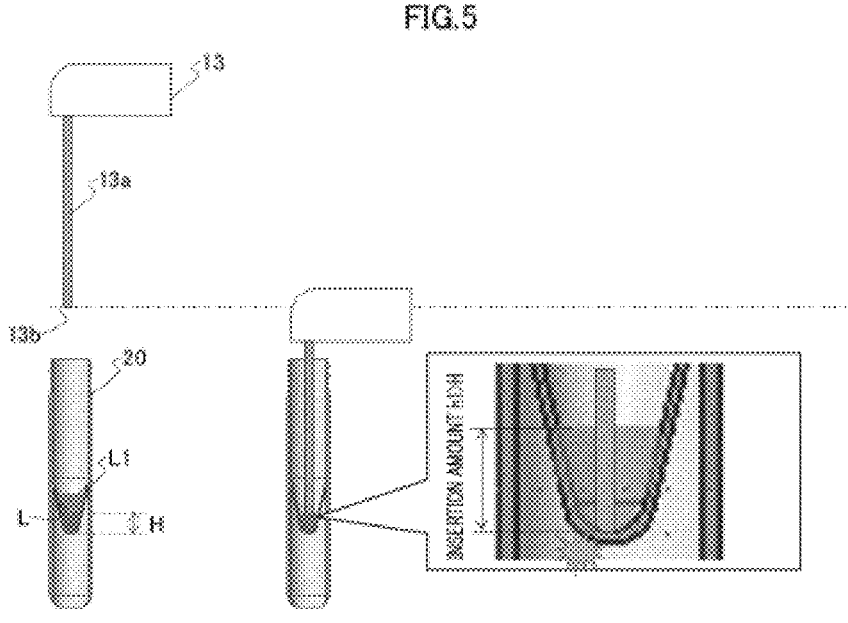
FIG. 5 is an explanatory drawing of a dispensing operation in dispensing a trace amount sample by a dispensing sequence of a general sample in the automatic analyzer of the embodiment.
Figure 6:
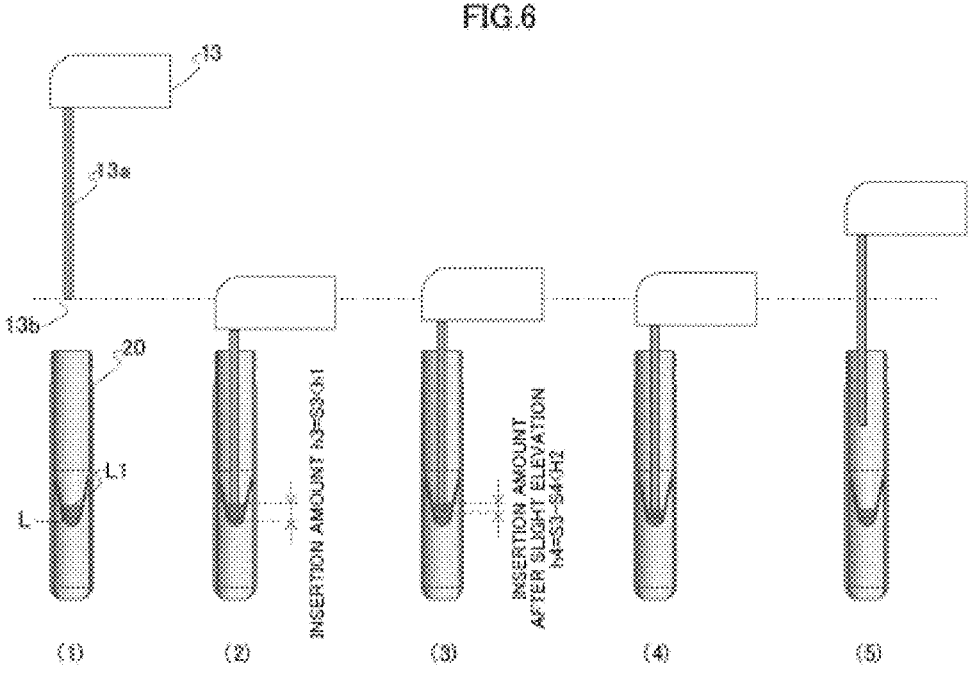
FIG. 6 is an explanatory drawing of a trace amount dispensing operation adding a slight elevation operation in the automatic analyzer of the embodiment.
Figure 7:
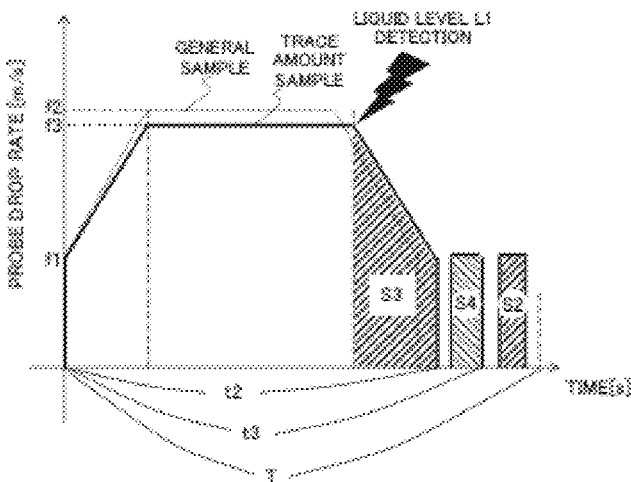
FIG. 7 is a drop operation drawing of a sample dispensing mechanism in dispensing a trace amount sample in the automatic analyzer of the embodiment.
Figure 8:
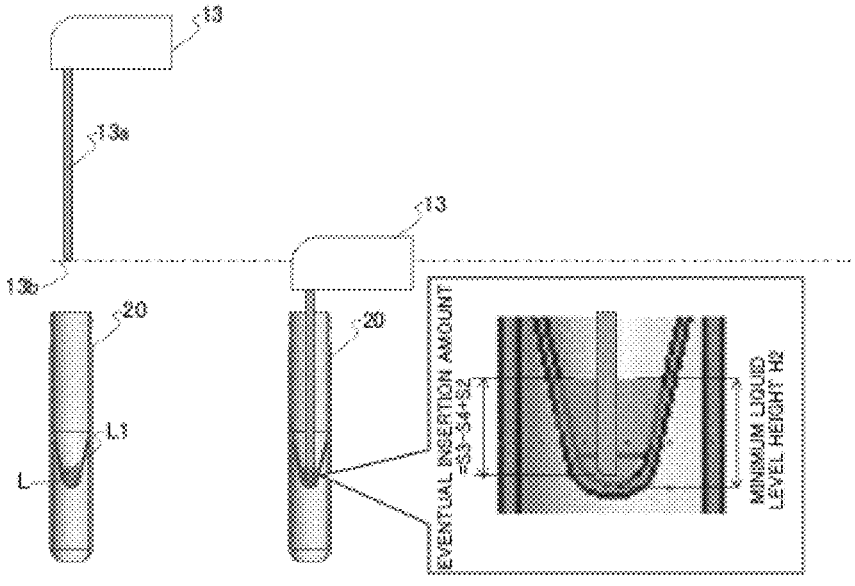
FIG. 8 is a drawing showing a state in dispensing a trace amount sample using a trace amount sample dispensing sequence in the automatic analyzer of the embodiment.

Next, in the sample dispensing operation, a step (hereinafter, a sample dispensing sequence) of aspirating, by the sample dispensing mechanisms 13 and 14, the sample from the sample container 20 holding the sample (trace amount sample) of the amount less than the specified amount will be described in detail with reference to FIGS. 5 to 8. FIG. 5 is a diagram showing a dispensing operation when the trace amount sample is dispensed by the dispensing sequence of the general sample in the automatic analyzer according to the embodiment. FIG. 6 is a diagram showing a trace amount dispensing operation in which a slight elevation operation is added. FIG. 7 is a diagram showing a drop operation of the sample dispensing mechanism during dispensing of the trace amount sample. FIG. 8 is a diagram showing a state in which the trace amount sample is dispensed using a trace amount sample dispensing sequence.

First, a case where the trace amount sample is dispensed using the sample dispensing sequence for the above-described general sample as it is will be described with reference to FIG. 5.

In the case of the trace amount sample as shown in FIG. 5, a height from a bottom of the sample container 20 to the liquid level L1 is smaller than that in the case of the general sample. When the distal end 13*b* is dropped as shown in (2) of FIG. 3 in a case where a height H from the bottom of the sample container 20 to the liquid level L1 is smaller than the insertion amount h1 of the distal end 13*b* into the sample, and when the distal end 13*b* is further dropped as shown in (3) of FIG. 3 in a case where the height H is smaller than an insertion amount (insertion amount h1+further drop amount S2) at the time of completion of the aspiration, the distal end 13*b* strongly comes into contact with the bottom of the sample container 20.

When such strong contact occurs, the distal end 13*b* is blocked in this state, and an aspiration failure case occurs. Alternatively, there may be a problem that the device determines that abnormal drop is detected when the distal end 13*b* excessively comes into contact with the bottom of the container, and the trace amount sample cannot be dispensed.

Therefore, in the automatic analyzer 100 according to the present embodiment, when the trace amount sample is to be dispensed, in order to prevent the distal end 13*b* from coming into contact with the bottom of the container during the aspiration of the syringe, it is necessary to reduce the insertion amount of the distal end 13*b* into the sample to be smaller than that in the general sample dispensing mode.

Therefore, when the sample is to be aspirated, the control unit 26 controls the sample dispensing mechanisms 13 and 14 such that, after the liquid level L1 is detected, the dispensing probe 13*a* of the sample dispensing mechanism 13 and the dispensing probe 14*a* of the sample dispensing mechanism 14 are dropped and stopped below the liquid level L1, then the dispensing probe 13*a* of the sample dispensing mechanism 13 and the dispensing probe 14*a* of the sample dispensing mechanism 14 are elevated and stopped, and then the dispensing probes 13*a* and 14*a* are further dropped while aspirating the sample. This operation mode is referred to as a trace amount dispensing mode (first mode). Hereinafter, the details of the trace amount dispensing mode (first mode) will be described with reference to FIG. 6.

The control unit 26 of the automatic analyzer 100 according to the present embodiment executes one of the trace amount dispensing mode (first mode) and the general sample dispensing mode (second mode) according to the type of the sample container 20 identified by the container identifying unit 29.

First, as shown in (1) of FIG. 6, the dispensing probe 13*a* is moved onto the sample container 20.

Next, as shown in (2) of FIG. 6, the dispensing probe 13*a* is dropped until the distal end 13*b* detects the liquid level using the static capacitance type liquid level detector 27. This step corresponds to a step of dropping and stopping the distal ends 13*b* of the dispensing probe 13*a* of the sample dispensing mechanism 13 and the dispensing probe 14*a* of the sample dispensing mechanism 14 below the liquid level L1.

An insertion amount h3 of the distal end 13*b* into the sample at this time corresponds to a predetermined area S3 in FIG. 7, and the control unit 26 sets the insertion amount h3 to a position closer to the liquid level L1, that is, sets the insertion amount h3 smaller than the insertion amount h1 when the dispensing probe 13*a* of the sample dispensing mechanism 13 and the dispensing probe 14*a* of the sample dispensing mechanism 14 are dropped and stopped below the liquid level L1 in the second mode shown in (2) of FIG. 3. In addition, the insertion amount h3 is preferably determined based on a shape of a target container and a minimum sample amount.

FIG. 7 shows a state of the drop operation of the sample dispensing mechanism 13 at this time.

As shown in FIG. 7, after the liquid level L1 is detected, a drop rate f3 when the dispensing probe 13*a* of the sample dispensing mechanism 13 and the dispensing probe 14*a* of the sample dispensing mechanism 14 are dropped and stopped below the liquid level L1 is set to be smaller than the drop rate f2 when the dispensing probe 13*a* of the sample dispensing mechanism 13 and the dispensing probe 14*a* of the sample dispensing mechanism 14 are dropped below the liquid level L1 in the second mode. The drop rate f3 is preferably smaller than the drop rate f2 within a range in which the dispensing operation of the sample falls within one analysis cycle even when the dispensing probe 13*a* of the sample dispensing mechanism 13 and the dispensing probe 14*a* of the sample dispensing mechanism 14 are elevated and stopped.

By setting the drop rate f3 to be smaller than the drop rate f2, a time t2 required until the dispensing probes 13*a* and 14*a* are stopped becomes longer than a time t1 required until the drop is stopped in the general sample dispensing mode.

Next, as shown in (3) of FIG. 6, the dispensing probe 13*a* is slightly elevated. An elevation rate at this time can be the above-described rate f1, and is not limited thereto. This step corresponds to a step of elevating and stopping the dispensing probe 13*a* of the sample dispensing mechanism 13 and the dispensing probe 14*a* of the sample dispensing mechanism 14.

An insertion amount h4 of the distal end 13*b* into the sample after the slight elevation operation at the completion of this step is obtained by subtracting an area S4 corresponding to the slight elevation operation from the area S3 in FIG. 7. The insertion amount h4 is preferably at a position lower than a minimum liquid level height H2. That is, a slight elevation operation rate and the area S4 are preferably selected such that the distal end 13*b* is not separated from the liquid level L1. In FIG. 7, the slight elevation operation rate is the rate f1, and is not limited to this rate.

A time t3 required until the slight elevation operation is completed is small in a slight elevation operation amount, and is basically sufficiently shorter than the time t2 required for the drop operation of the dispensing probe 13*a*. Therefore, it can be said that the influence on the analysis cycle is small.

Next, as shown in (4) of FIG. 6, the syringe is operated to aspirate the sample. In order to prevent the dispensing probe 13*a* from separating from the sample liquid level during aspiration, the dispensing probe 13*a* is further dropped. This step corresponds to a step of further dropping the dispensing probe 13*a* while aspirating the sample.

A drop amount at this time corresponds to the predetermined area S2 in FIG. 6*a*, and can be the same as that in the general sample dispensing mode. At this time, there is a possibility that the distal end 13*b* collides with a bottom surface of the container, but the sample dispensing mechanisms 13 and 14 are often provided with a collision detection sensor and play in preparation for collision. If the contact is not strong, there is little problem in the subsequent dispensing. Therefore, the drop amount can be the same. The drop amount is not limited to the same amount, and can be reduced within a range in which a specified amount of aspiration is possible without colliding with the bottom surface of the container.

Finally, as shown in (5) of FIG. 6, the dispensing probe 13*a* is elevated after the aspiration is completed.

By applying the trace amount dispensing mode to the trace amount sample as described above, as shown in FIG. 8, an insertion amount h of the distal end 13*b* into the sample is reduced as compared with the general sample mode, and an aspiration operation can be performed while preventing the distal end 13*b* from strongly coming into contact with the bottom of the container even for the trace amount sample.

Since a total time required for the trace amount dispensing mode is equal to or less than a maximum aspiration time T allowable for the aspiration operation in the dispensing operation of the device in the predetermined one cycle, a processing capacity of the device is not reduced.

Next, effects of the present embodiment will be described.

In the automatic analyzer 100 according to the present embodiment described above, when the sample is to be aspirated, the control unit 26 controls the sample dispensing mechanisms 13 and 14 such that, after the liquid level L1 is detected, the dispensing probe 13*a* of the sample dispensing mechanism 13 and the dispensing probe 14*a* of the sample dispensing mechanism 14 are dropped and stopped below the liquid level L1, then the dispensing probe 13*a* of the sample dispensing mechanism 13 and the dispensing probe 14*a* of the sample dispensing mechanism 14 are elevated and stopped, and then the dispensing probes 13*a* and 14*a* are further dropped while aspirating the sample.

Accordingly, strong contact between the distal end 13*b* and the bottom of the container can be avoided, and a trace amount of a sample can be dispensed as compared with the related art. Therefore, various effects such as reduction in patient burden and reduction in running cost can be attained.

The control unit 26 has the second mode of controlling the sample dispensing mechanisms 13 and 14 such that the dispensing probe 13*a* of the sample dispensing mechanism 13 and the dispensing probe 14*a* of the sample dispensing mechanism 14 are dropped and stopped below the liquid level L1, and then further dropped while aspirating the sample. When the general sample is dispensed in the above-described trace amount dispensing mode, since there is a possibility that a supernatant or a component corresponding thereto is dispensed, it is possible to avoid dispensing the supernatant or the component corresponding thereto when the general sample containing a specified amount of the sample is dispensed in the second mode, and it is possible to reliably perform accurate analysis.

Further, after the liquid level L1 is detected, the control unit 26 sets the insertion amount h3 when the dispensing probe 13*a* of the sample dispensing mechanism 13 and the dispensing probe 14*a* of the sample dispensing mechanism 14 are dropped and stopped below the liquid level L1 to a position that is closer to the liquid level L1 than is a position of the insertion amount h1 when the dispensing probe 13*a* of the sample dispensing mechanism 13 and the dispensing probe 14*a* of the sample dispensing mechanism 14 are dropped and stopped below the liquid level L1 in the second mode. Therefore, it is possible to prevent the distal end 13*b* from excessively coming into contact with the bottom of the container and to prevent the abnormal drop detection from being determined.

After the liquid level L1 is detected, the control unit 26 sets the drop rate when the dispensing probe 13*a* of the sample dispensing mechanism 13 and the dispensing probe 14*a* of the sample dispensing mechanism 14 are dropped and stopped below the liquid level L1 to be smaller than the drop rate when the dispensing probe 13*a* of the sample dispensing mechanism 13 and the dispensing probe 14*a* of the sample dispensing mechanism 14 are dropped below the liquid level L1 in the second mode. Therefore, it is also possible to prevent the distal end 13*b* from excessively coming into contact with the bottom of the container.

Further, after the liquid level L1 is detected, the control unit 26 sets the drop rate when the dispensing probe 13*a* of the sample dispensing mechanism 13 and the dispensing probe 14*a* of the sample dispensing mechanism 14 are dropped and stopped below the liquid level L1 to be smaller than the drop rate when the dispensing probe 13*a* of the sample dispensing mechanism 13 and the dispensing probe 14*a* of the sample dispensing mechanism 14 are dropped below the liquid level L1 in the second mode within a range in which the dispensing operation of the sample falls within one analysis cycle even when the dispensing probe 13*a* of the sample dispensing mechanism 13 and the dispensing probe 14*a* of the sample dispensing mechanism 14 are elevated and stopped. Therefore, it is possible to prevent the dispensing operation from being executed over a plurality of cycles when the device exceeds the maximum aspiration time T that can be allowable within the predetermined one cycle, and it is possible to dispense the trace amount sample without reducing the processing capacity of the device.

The device further includes the container identifying unit 29 that identifies the type of the sample container 20. The control unit 26 can selectively use the first mode and the second mode with high accuracy by executing, according to the type of the sample container 20 identified by the container identifying unit 29, one of the second mode and a mode in which the sample dispensing mechanisms 13 and 14 are controlled such that the dispensing probe 13*a* of the sample dispensing mechanism 13 and the dispensing probe 14*a* of the sample dispensing mechanism 14 are dropped and stopped below the liquid level L1, then the dispensing probe 13a of the sample dispensing mechanism 13 and the dispensing probe 14a of the sample dispensing mechanism 14 are elevated and stopped, and then the dispensing probes 13a and 14a are further dropped while aspirating the sample.

Further, the control unit 26 elevates the dispensing probe 13a of the sample dispensing mechanism 13 and the dispensing probe 14a of the sample dispensing mechanism 14 in a range in which the distal ends are not separated from the liquid level L1, and thus it is possible to reliably avoid empty aspiration at the time of further dropping during aspiration.

<Others>

The invention is not limited to the embodiment described above, and various modifications and applications are possible. The embodiment described above has been described in detail for easy understanding of the invention, and the invention is not necessarily limited to those having all the configurations described above.

REFERENCE SIGNS LIST

1: reaction disk
2: reaction container
3: washing mechanism
4: spectrophotometer
4a: light source
5, 6: stirring mechanism
7, 8, 9, 10: reagent dispensing mechanism
11: reagent disk
12: reagent bottle
13, 14: sample dispensing mechanism
13a, 14a: dispensing probe
13b: distal end
15, 16: ordinary washing tank
17, 18: drying mechanism
19: special washing tank
20: sample container
21: rack
22: sample transportation mechanism
23: reagent pump
24: sample pump
25: washing pump
26: control unit
27, 28: liquid level detector
29: container determination unit
30, 31, 32, 33: washing tank
100: automatic analyzer
C1: sample aspiration position
C2: sample discharge position

The invention claimed is:

1. An automatic analyzer, comprising:
a sample dispensing mechanism configured to dispense a sample held by a sample container;
a liquid level detector configured to detect the liquid level of the sample; and
a control unit configured to control the operation of the sample dispensing mechanism in a first mode and a second mode,
wherein in the first mode of aspirating the sample, the control unit is configured to control the sample dispensing mechanism so as to
detect the liquid level,
to thereafter position the distal end of the sample dispensing mechanism such that the distal end is dropped and stopped below the detected liquid level within such range that the distal end is not in contact with a bottom surface of the sample container, to thereafter position the distal end of the sample dispensing mechanism to be elevated and stopped within such range that the distal end of the sample dispensing mechanism does not depart from the liquid level, and
to thereafter position the distal end of the sample dispensing mechanism to be further dropped while aspirating the sample,
wherein in the second mode of aspirating the sample, the control unit controls is configured to control the sample dispensing mechanism so as to
position the distal end of the sample dispensing mechanism dropped and stopped below the detected liquid level, and
then after position the distal end of the sample dispensing mechanism further lower from the previous position into the sample while aspirating the sample.

2. The automatic analyzer according to claim 1, whereinafter detecting the liquid level, the control unit allows the insertion amount in dropping and stopping the distal end of the sample dispensing mechanism below the liquid level to be a position closer to the liquid level than the insertion amount in dropping and stopping the distal end of the sample dispensing mechanism below the liquid level in the second mode.

3. The automatic analyzer according to claim 2, wherein after detecting the liquid level in the first mode, the control unit allows the drop rate in dropping and stopping the distal end of the sample dispensing mechanism below the liquid level to be slower than the drop rate in dropping the distal end of the sample dispensing mechanism below the liquid level in the second mode.

4. The automatic analyzer according to claim 2, wherein after detecting the liquid level in the first mode, the control unit allows the drop rate in dropping and stopping the distal end of the sample dispensing mechanism below the liquid level to be slower than the drop rate in dropping the distal end of the sample dispensing mechanism below the liquid level in the second mode within such range that motion of the dispensing operation is completed within one analysis cycle even when the distal end of the sample dispensing mechanism is elevated and stopped.

5. The automatic analyzer according to claim 2, further comprising: a container determination unit that determines the kind of the sample container, wherein the control unit executes either the first mode of controlling the sample dispensing mechanism so as to allow the distal end of the sample dispensing mechanism to be dropped and stopped below the liquid level, to thereafter allow the distal end of the sample dispensing mechanism to be elevated and stopped, and to thereafter allow the distal end of the sample dispensing mechanism to be further dropped while aspirating the sample, or the second mode, according to the kind of the sample container determined by the container determination unit.

6. A sample aspiration method in an automatic analyzer that comprises:
a sample dispensing mechanism configured to dispense a sample held by a sample container, and
a liquid level detector configured to detect the liquid level of the sample, and
a control unit configured to control the operation of the sample dispensing mechanism in a first mode and a second mode,
wherein the first mode comprises the steps of:
detecting the liquid level of the sample in the sample container, after detecting the liquid level, allowing the distal end of the sample dispensing mechanism to be dropped and stopped below the liquid level within such range that the distal end is not in contact with bottom surface of the sample container;

thereafter allowing the distal end of the sample dispensing mechanism to be elevated and stopped within such range that the distal end of the sample dispensing mechanism does not depart from the liquid level; and thereafter allowing the distal end of the sample dispensing mechanism to be further dropped while aspirating the sample wherein the second mode of aspirating the sample comprises the control unit is configured to control the sample dispensing mechanism comprising the steps of:

position the distal end of the sample dispensing mechanism dropped and stopped below the detected liquid level, and to then after position the distal end of the sample dispensing mechanism further lower from the previous position into the sample while aspirating the sample.

\* \* \* \* \*